(12) United States Patent  (10) Patent No.: US 7,703,684 B2
Inubushi et al.  (45) Date of Patent: Apr. 27, 2010

(54) INFORMATION INPUT AND OUTPUT DEVICE AND GAME MACHINE USING INFORMATION INPUT AND OUTPUT DEVICE

(75) Inventors: Takashi Inubushi, Tokyo (JP); Koki Atobe, Tokyo (JP); Makiko Otomi, Tokyo (JP); Shuho Nishimura, Tokyo (JP); Takahiko Daijo, Tokyo (JP); Shigehito Mukasa, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 129 days.

(21) Appl. No.: 10/596,352

(22) PCT Filed: Nov. 26, 2004

(86) PCT No.: PCT/JP2004/017580

§ 371 (c)(1),
(2), (4) Date: Sep. 14, 2006

(87) PCT Pub. No.: WO2005/057476

PCT Pub. Date: Jun. 23, 2005

(65) Prior Publication Data

US 2007/0080222 A1    Apr. 12, 2007

(30) Foreign Application Priority Data

Dec. 10, 2003  (JP)  ............................. 2003-412033

(51) Int. Cl.
*G06K 7/00*  (2006.01)
(52) U.S. Cl. ...................... 235/486; 235/483
(58) Field of Classification Search ................ 235/380, 235/483, 484, 485, 486
See application file for complete search history.

(56) References Cited

U.S. PATENT DOCUMENTS 3,553,436 A * 1/1971 Webb et al. ................. 235/447
4,596,668 A * 6/1986 Berbeco ..................... 252/500

(Continued)

FOREIGN PATENT DOCUMENTS

JP        60-140158 U        9/1985

(Continued)

OTHER PUBLICATIONS

Patent Abstracts of Japan for JP2002-259902 published on Sep. 13, 2002.

(Continued)

*Primary Examiner*—Kumiko C Koyama
(74) *Attorney, Agent, or Firm*—Darby & Darby (57) ABSTRACT

An information input and output device for communicating information with an information recording unit of a card, includes a card support unit that includes a card support surface for sliding the card while supporting the card from one surface side, a card end unit that includes a card end surface provided to protrude from the card support surface, and an input and output executing unit that is positioned to face the information recording unit of the card when the card is slid on the card support surface while abutting the card against the card end surface, and that executes at least one of reading of the information from the information recording unit and writing of the information to the information recording unit.

10 Claims, 9 Drawing Sheets

U.S. PATENT DOCUMENTS

| | | | |
|---|---|---|---|
| 4,931,622 A * | 6/1990 | Ohtsuki et al. | 235/487 |
| 5,739,520 A | 4/1998 | Atsumi et al. | |
| 6,089,457 A * | 7/2000 | LaManna et al. | 235/475 |
| 6,098,889 A * | 8/2000 | Ogawa et al. | 235/492 |
| 6,241,545 B1 * | 6/2001 | Bricaud et al. | 439/326 |
| 6,263,090 B1 | 7/2001 | Scott et al. | |
| 7,150,403 B2 * | 12/2006 | Nakajima | 235/486 |
| 2002/0179709 A1 | 12/2002 | Mehler | |
| 2003/0036425 A1 | 2/2003 | Kaminkow et al. | |

FOREIGN PATENT DOCUMENTS

| | | |
|---|---|---|
| JP | 3-113459 U | 11/1991 |
| JP | 6-38030 U | 5/1994 |
| JP | 2002-143739 A | 5/2002 |
| JP | 2002-224443 A | 8/2002 |
| JP | 2002-259902 A | 9/2002 |
| JP | 2002-301264 A | 10/2002 |
| JP | 2004-215806 A | 8/2004 |
| KR | 1995-0004262 | 5/1995 |

OTHER PUBLICATIONS

Patent Abstracts of Japan for JP3-113459 published on Nov. 20, 1991.

Patent Abstracts of Japan for JP6-38030 published on May 20, 1994.

International Search Report for PCT/JP2004/017580 mailed Jan. 18, 2005.

Patent Abstracts of Japan for JP-U60-140158 published on Sep. 17, 1985.

Patent Abstracts of Japan for JP2002-301264 published on Oct. 15, 2002.

Patent Abstracts of Japan for JP2002-143739 published on May 21, 2002.

Patent Abstracts of Japan for JP2004-215806 published on Aug. 5, 2004.

Patent Abstracts of Japan for JP2002-224443 published on Aug. 13, 2002.

* cited by examiner

INFORMATION INPUT AND OUTPUT DEVICE AND GAME MACHINE USING INFORMATION INPUT AND OUTPUT DEVICE

CROSS-REFERENCE TO PRIOR APPLICATION

This is a U.S. National Phase Application under 35 U.S.C. §371 of International Patent Application No. PCT/JP2004/017580 filed Nov. 26, 2004, and claims the benefit of Japanese Patent Application No. 2003-412033 filed Dec. 10, 2003, both of which are incorporated by reference herein. The International Application was published in Japanese on Jun. 23, 2005 as WO 2005/057476 A1 under PCT Article 21(2).

TECHNICAL FIELD

The present invention relates to an information input and output device for communicating information with an information recording unit of a card.

BACKGROUND ART

As a device that reads information such as information of barcodes recorded on a card, there is known a card reader device configured so that the card is caused to be swipes along a card read slit, and so that a sensor receives a reflecting light or a fluorescent emission from the card relative to a reading light irradiated to traverse the slit (see, for example, Patent Literature 1).

Patent Literature 1: Japanese Patent Application Laid-Open No. 2002-224443

DISCLOSURE OF THE INVENTION

Problems to be Solved by the Invention

The conventional card reader device is required to pass the card through the slit in a vertical position with the card abbuted by a user's hand. Due to this, it takes time and labor to perform a read operation. Particularly if a plurality of cards are to be sequentially read, the cards cannot be efficiently handled. Such a problem occurs not only with the device that reads information from cards but also with a device that writes some information to cards.

It is, therefore, an object of the present invention to provide an information input and output device capable of efficiently reading or writing Information from or to a card, and a game machine using the information input and output device.

Means to Solve the Problems

The present invention solves the above-stated problems by the following means.

An information input and output device according to the present invention is an information input and output device for communicating information with an information recording unit of a card, comprising: a card support unit that includes a card support surface for sliding the card while supporting the card from one surface side; a card end unit that includes a card end surface provided to protrude from the card support surface; and an input and output executing unit that is arranged to face the information recording unit of the card when the card is slid on the card support surface while abutting the card against the card end surface, and that executes at least one of reading of the information from the information recording unit and writing of the information to the information recording unit. The information input and output device according to the present invention thereby solve the above-stated problems.

According to the present invention, the card is slid on the card support surface while abutting the card against the card end surface, and the card is caused to pass through the input and output executing unit. It is thereby possible to communicate information between the information recording unit and the input and output executing unit. The card end surface can guide the card in a predetermined direction while the card is supported on the card support surface. Therefore, it is possible to dispense with an operation such that a user holds the card in a standing state to pass through the slit, and to provide a stable attitude of the card while the information is read or written from or to the card. Accordingly, the reading or writing of information can be efficiently performed.

If the card support surface is configured to extend horizontally, then a plurality of cards can be arranged on the card support surface side by side, those cards can be slid on the card support surface to communicate the information sequentially without lifting the cards from the card support surface. It is, therefore, possible to efficiently handle a plurality of cards.

If the card end unit is arranged in a back portion of the card support surface and the card end surface extends in aright-left direction from a viewpoint of a user who uses the information input and output device, then the card can be slid on the card support surface in a right-left direction along the card end surface, and the information can be sequentially communicated. It is, therefore, possible to further efficiently read or write the information.

It is preferable hat the card end unit exceeds an edge of the card support surface and extends toward a rear surface side of the card support surface in a portion of an intersection between the card support surface and the card end surface. If so, it is possible to prevent the card from being caught up in a gap between the card support surface and the card end surface.

In the information input and output device according to the present invention, the card support surface may consist of a translucent material, and the input and output executing unit may be arranged to face the card information recording unit from a rear surface side of the card support unit. By so arranging, the input and output executing unit can be hidden behind the rear side of the card support surface, which can suppress damage or proceeding with stain of the input and output executing unit.

Preferably, the card support surface consists of a material that can smoothly slide the card on the card support surface. From this viewpoint, the card support surface can consist of a methacrylic resin. The card support surface consists of preferably a methacrylic resin having an antistatic property of 0.1 seconds or less in a testing method specified in JIS L-1094, more preferably an acrylic resin that constitutes the card support surface and that has a surface hardness corresponding to a pencil hardness equal to or higher than five H, the pencil hardness being specified in JIS D-0202.

The information input and output device according to the present invention can be applied to various devices that read or write information from or to the card. As one of preferable embodiments, the information input and output device according to the present invention can be provided to an operation panel unit of a game machine. The game machine having such a configuration can read information on a lot of cards in a limited period of time and give various changes to the content of a game.

According to another scope of the present invention, an information input and output device is an information input and output device for communicating information with an information recording unit of a card, and can be configured to comprise a card support unit that includes a card support surface for sliding the card while supporting the card from one surface side; and an input and output executing unit that executes at least one of reading of the information from the information recording unit of the card sliding across the card support surface and writing of the information to the information recording unit of the card sliding across the card support surface, wherein the card support surface consists of a methacrylic resin having an antistatic property of 0.1 seconds or less in a testing method specified by JIS L-1094 In this case, it is preferable that the acrylic resin that constitutes the card support surface has a surface hardness corresponding to a pencil hardness equal to or higher than five H, pencil hardness being specified in JIS D-0202.

The information input and output device stated above can smoothly slide the card on the card support surface. Therefore, it is possible to provide the information input and output device suitable particularly for a purpose of efficiently reading or writing information from or to a lot of cards.

The information input and output device according to the present invention is a concept that involves a device that performs either input or output of the information to or from the information recording unit of the card and also a device that performs both input and output of the information.

Effects of the Invention

The information input and output device according to the present invention enables the card end surface to guide the card in a predetermined direction while the card is supported on the card support surface. Therefore, it is possible to dispense with an operation for user's holding the card in a standing state to pass through the slit, and to provide a stable attitude of the card while the information is read or written from or to the card. Reading or writing of information can be efficiently performed. The information input and output device according to another aspect of the present invention can smoothly slide the card on the card support surface. Therefore, it is possible to provide the information input and output device suitable particularly for a purpose of efficiently reading or writing information from or to many cards.

BEST MODE FOR CARRYING OUT THE INVENTION

Figure 1:
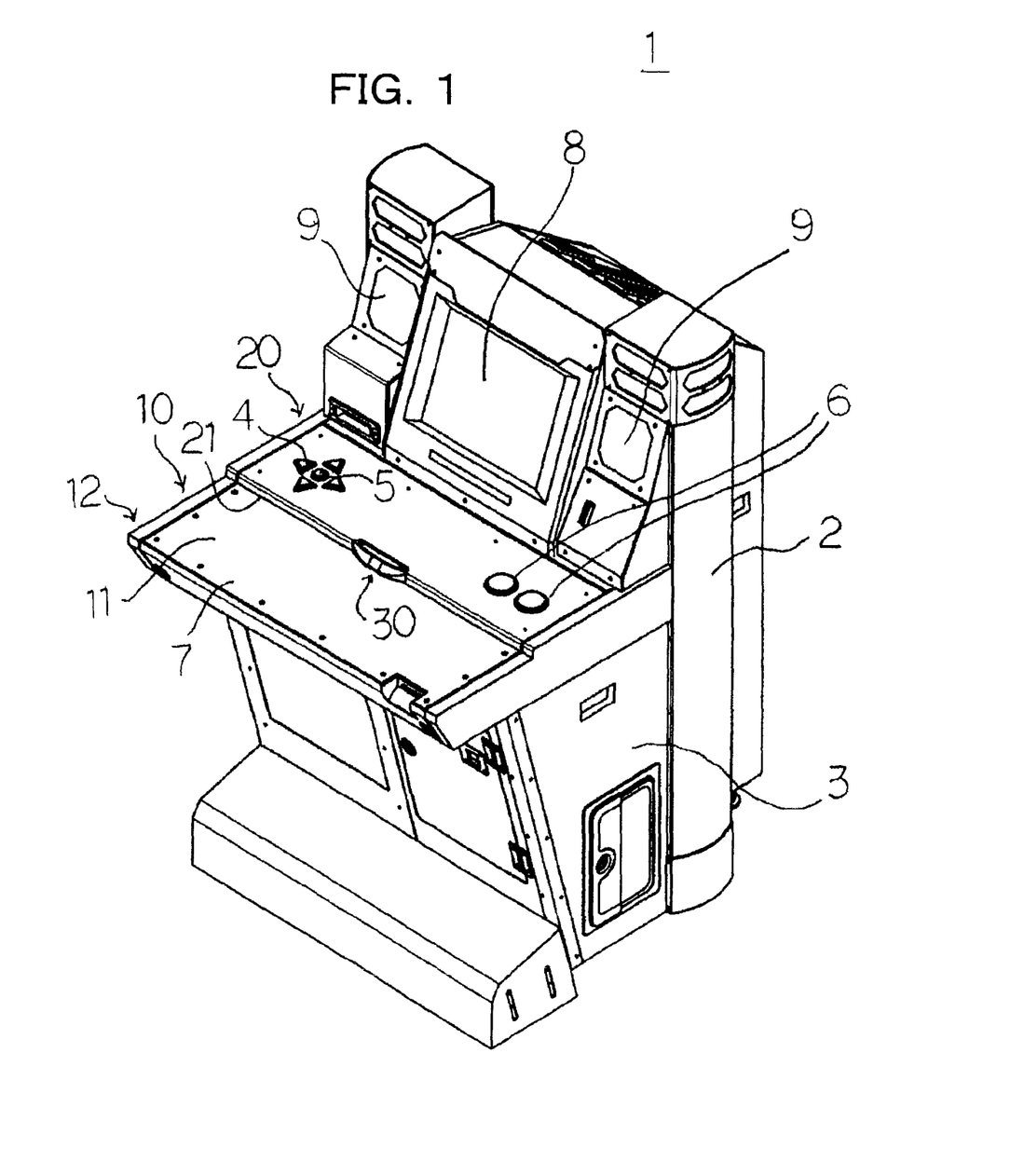
FIG. 1 is a perspective view of a game machine to which an information input and output device according to the present invention is applied.

FIG. 1 shows an embodiment of a game machine to which an information input and output device according to the present invention is applied. This game machine 1 is configured as a so-called arcade game machine that permits a player to play a game within a certain range in exchange for consumption of a predetermined economic value, which is typically input of a medal that transubstantiates a game value or withdrawal of points from a prepaid card.

Figure 8:
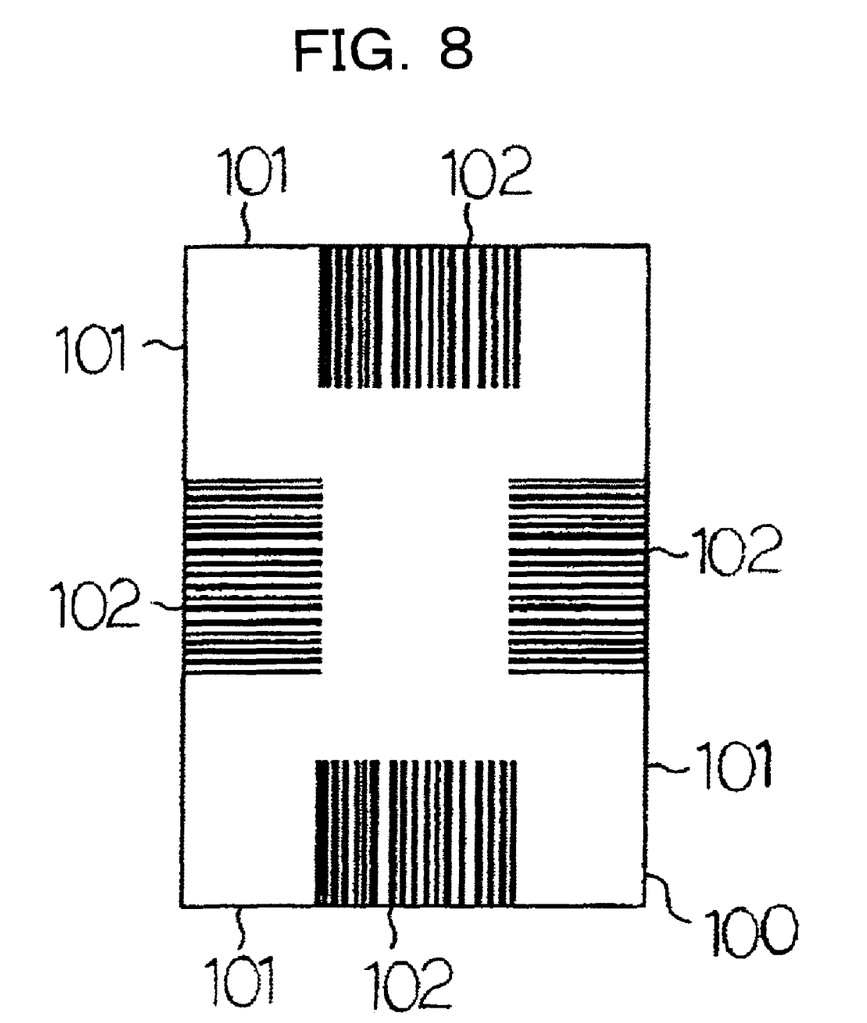
FIG. 8 is a plan view of a card used in the game machine.

A table 3 protruding forward is provided to a housing 2 of the game machine 1, and an upper surface of the table 3 is configured as an operation panel 7 that includes various operation buttons 4, 5, and 6 operated by the player. An information input and output device 10 according to the present invention is applied to the operation panel 7, and a monitor 8, loudspeakers 9, and the like are mounted to an inner part of the information input and output device 10. According to an instruction given to the player through the monitor 8 or the like, the player allows the information input and output device 10 to read information of barcodes (information recording units) 102 recorded on four sides 101 of each of cards 100 (see FIG. 8) of an arbitrary type, thereby proceeding with a game. It is noted that each barcode 102 is printed with a so-called stealth ink which is impossible or difficult for the player to visually discriminate. However, the information recording unit of the card according to the present invention is not limited to the barcodes but may have various other configurations. The card 100 is obtained by varnishing a surface of a NW paper having a grammage of 360 g/m$^2$. However, a material for the card 100 may be appropriately changed.

Figure 2:
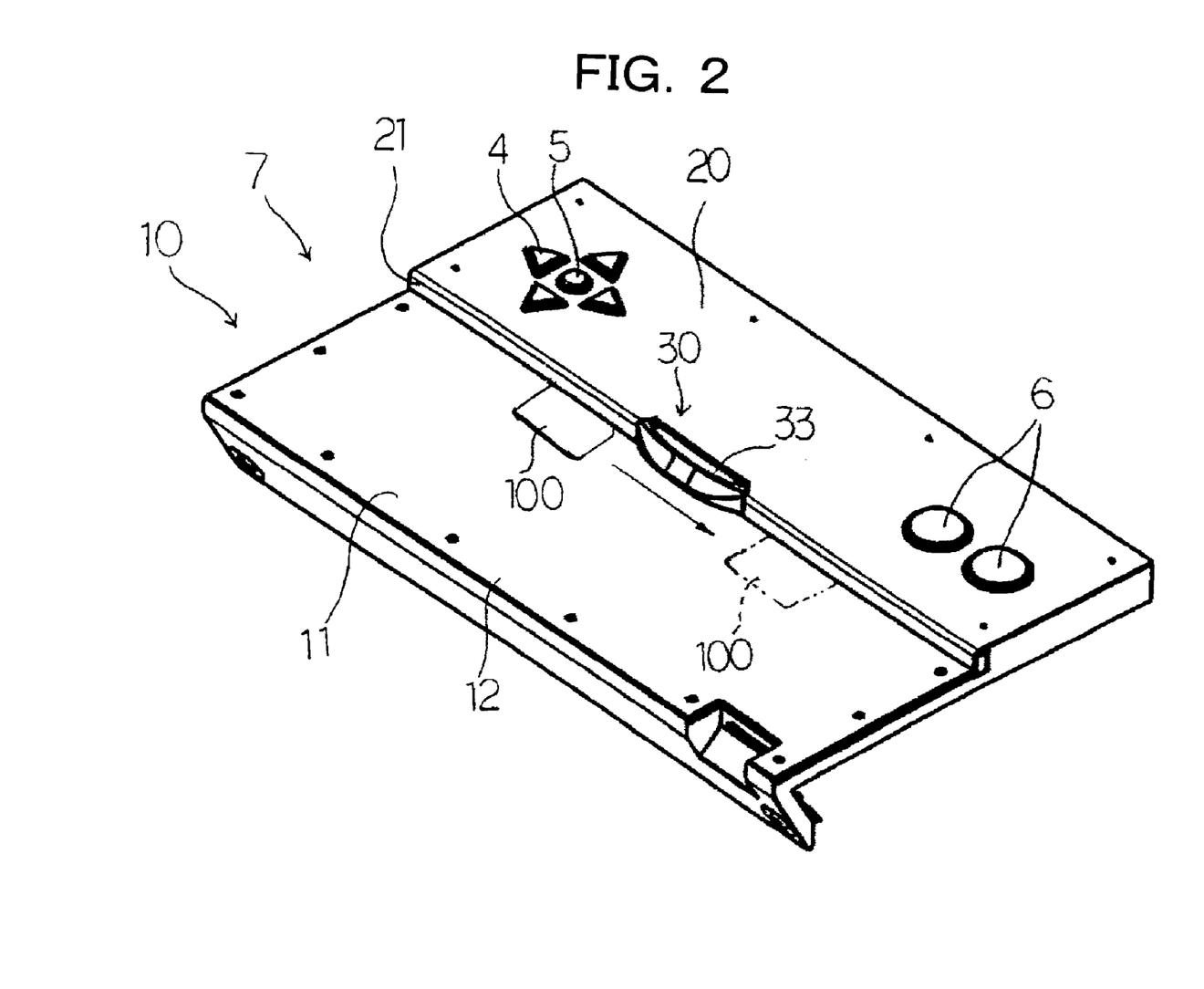
FIG. 2 is an enlarged perspective view of an operation panel unit of the game machine shown in FIG. 1.
Figure 3:
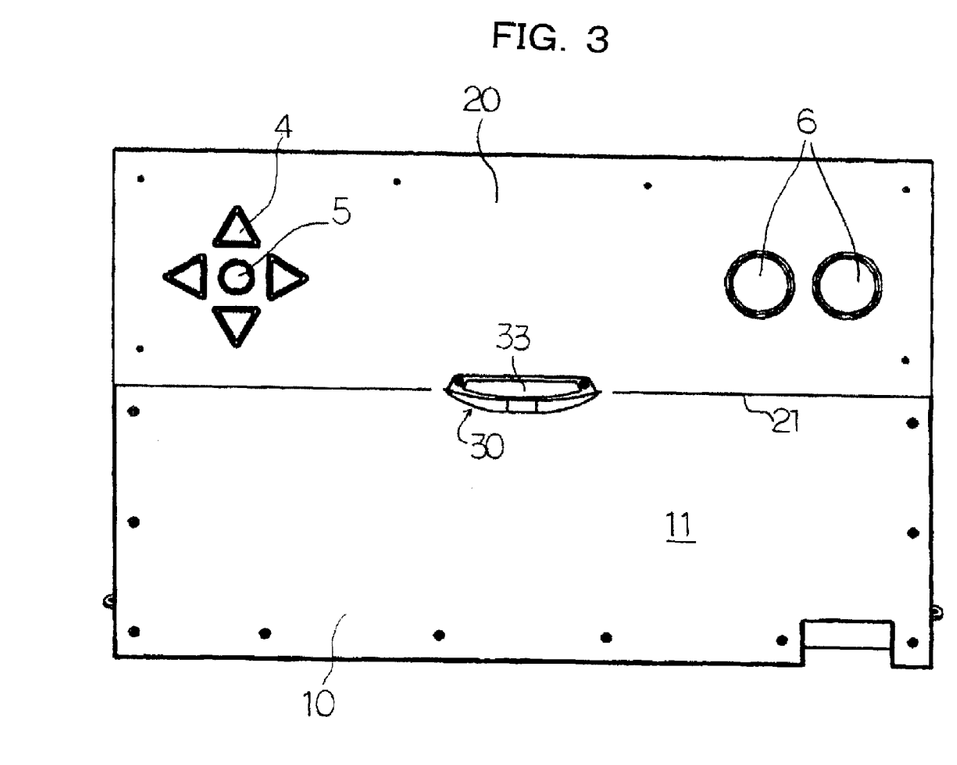
FIG. 3 is a plan view of the operation panel shown in FIG. 2.
Figure 4:
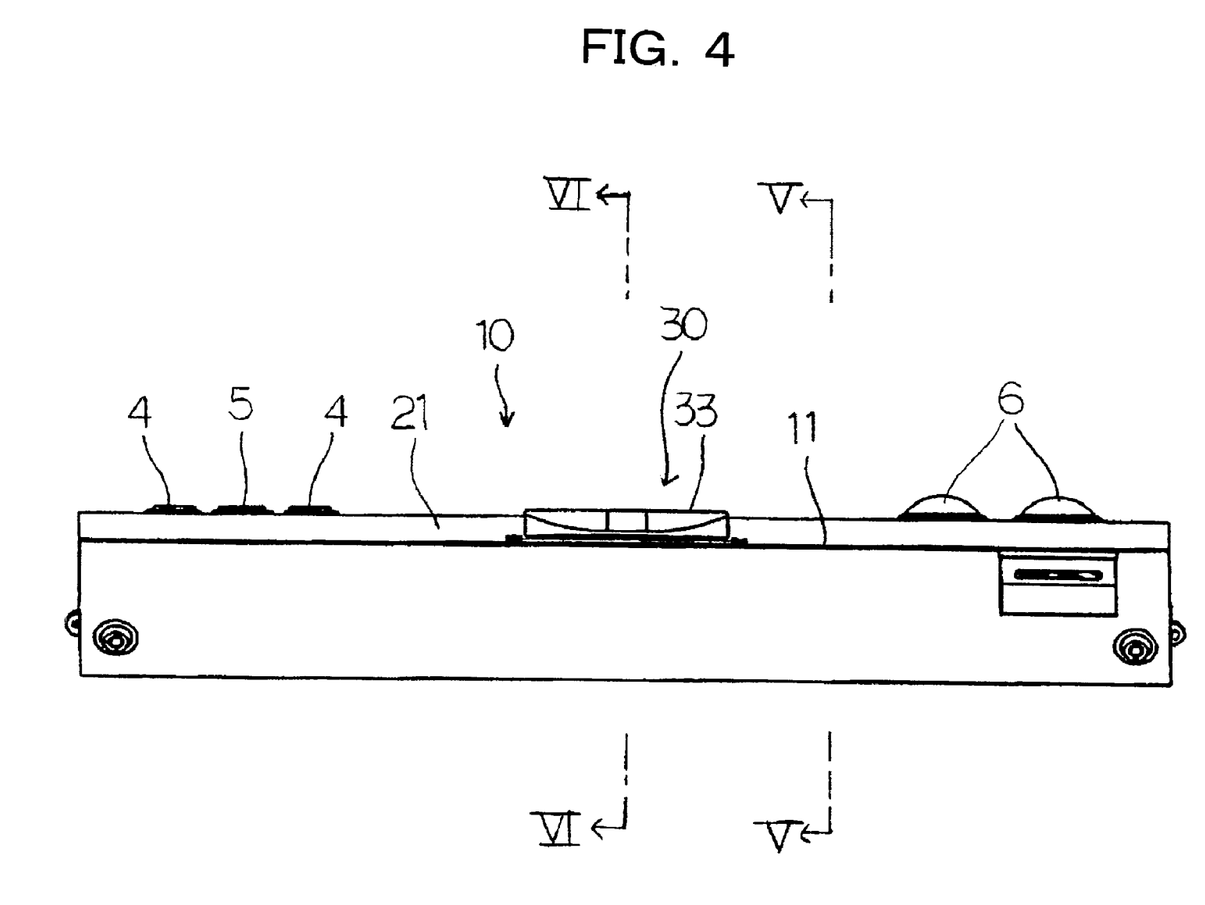
FIG. 4 is a front view of the operation panel shown in FIG. 2.
Figure 5:
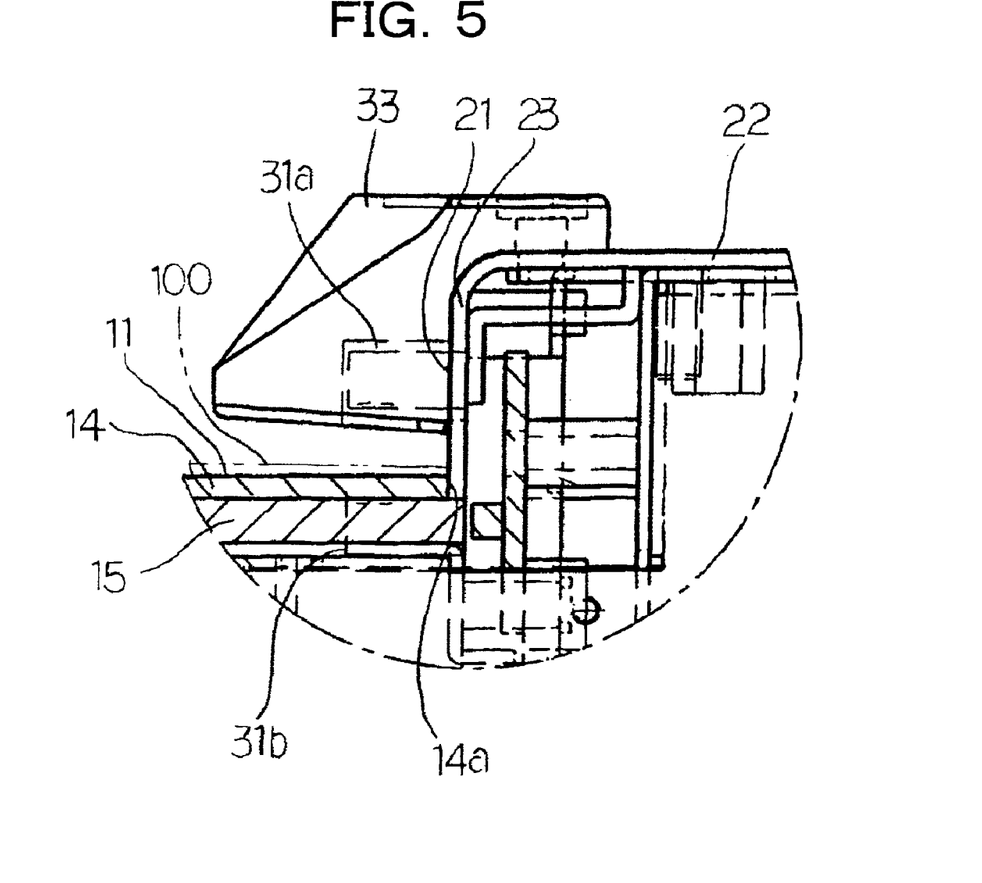
FIG. 5 is a cross-sectional view taken along a line V-V of FIG. 4.
Figure 9:
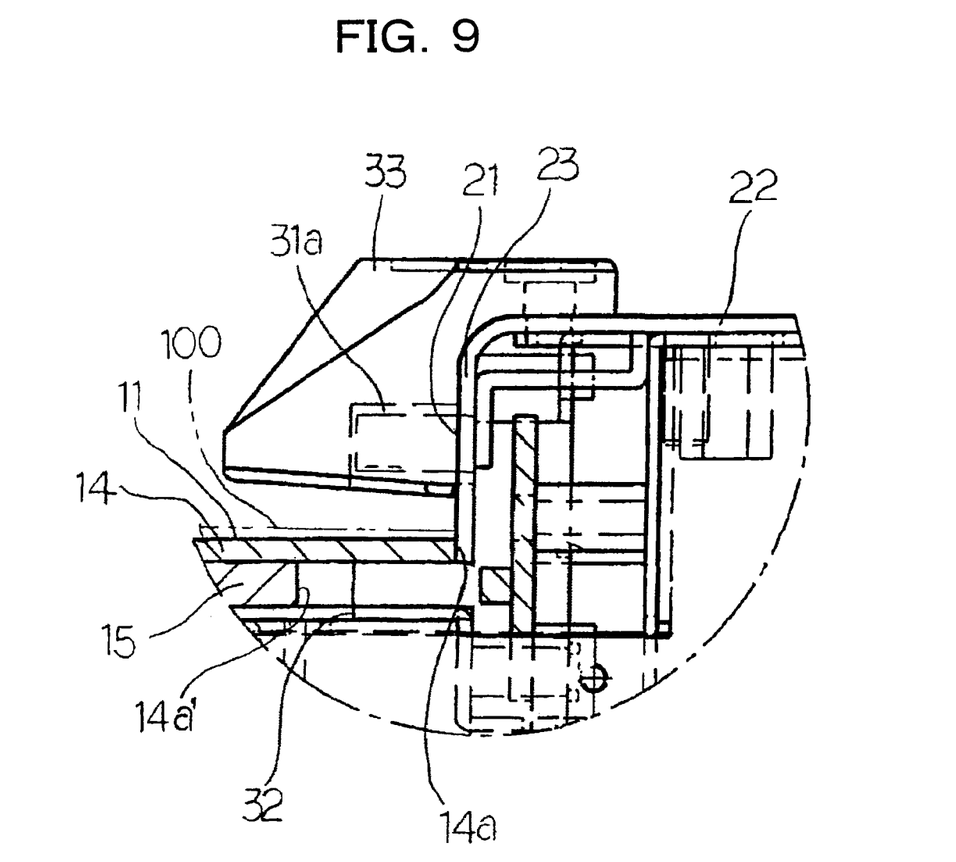
FIG. 9 is a cross-sectional view taken along a line VI-VI of FIG. 4.

FIG. 2 is a perspective view of the operation panel 7. FIG. 3 is a plan view thereof, and FIG. 4 is a front view thereof. FIG. 5 is a cross-sectional view taken along a line V-V of FIG. 4. FIG. 9 is a cross-sectional view taken along a line VI-VI of FIG. 4. As evident from these drawings, the information input and output device 10 includes a card support unit 12 that includes a card support surface 11 extending in a horizontal direction, and a card end unit 20 that includes a card end surface 21 provided to protrude from the card support surface 11. As evident from FIG. 5, the card support unit 12 is configured so that two acrylic plates 14 and 15 are vertically stacked on a substrate 13 consisting of an opaque material such as a steel plate. An upper surface of the first acrylic plate 14 arranged on an upper surface side functions as the card support surface 11. the card support surface 11 has an area large enough to arrange thereon a lot of cards 100.

The first acrylic plate 14 consists of a methacrylic resin so as to be able to smoothly slide the cards 100 on the card support surface 11 while supporting the cards 100 from the lower surface thereof on the support surface 11. While various methacrylic resins are present, it is preferable to use an acrylic plate consisting of a superior antistatic methacrylic resin as the first acrylic plate 14 with a view of preventing adsorption due to static electricity of the card 100. It is particularly preferable to use an acrylic plate that exhibits an antistatic property of 0.1 seconds or less in a testing method specified in JIS L-1094. In this JIS testing method, a distance between a sample and an applied voltage is set to 20 millimeters, a distance between the sample and a detection electrode is set to 15 millimeters, a voltage of +10000 volts is applied to the sample for 30 seconds under an environment of a temperature of 20C and a humidity of 60% RH, and a charge potential and an attenuation time of the sample after the voltage is applied to the sample are tested. The antistatic property of the acrylic plate was evaluated based on time required until the charge potential is reduced by half in this testing method. This antistatic property can be evaluated based on a surface resistivity (sheet resistance) of the acrylic plate. If an acrylic plate the surface resistivity of which is higher than $1 \times 10^{15}$ Ω/□ is used, static electricity is generated when the card 100 is slid, thereby adversely influencing the card 100. If the surface resistivity is lower than $1 \times 10^{12}$ Ω/□, preferably equal to or lower than $1 \times 10^{10}$ Ω/□, the card 100 is not adversely influenced.

Further, with a view of reducing a friction between the card support surface 11 and each card 100, at least the upper surface of the first acrylic plate 14, i.e., the card support surface 11 preferably consists of a material having a high scratch resistance. More preferably, the card support surface 11 has a hardness corresponding to a pencil hardness equal to or higher than about five H, the pencil hardness being specified in JIS D-0202. As the acrylic resin that satisfies the antistatic property and surface hardness conditions, a product name of "SUMIELEC FT000" manufactured by Sumitomo Chemicals Co., Ltd. can be appropriately used.

On the other hand, a material for the second acrylic plate 15 arranged on a lower surface side may be an arbitrary one. It the first acrylic plate 14 is thick enough, the second acrylic plate 15 may not be used.

The card end unit 20 is configured so that a cover panel 22 formed by sheet processing of a stainless plate is attached in rear of the card support unit 11. A bent portion 23 bent downward is provided on a front end of the cover panel 22, and a front surface of the bent portion 23 functions as the card end surface 21. The card end surface 21 extends straight laterally, if viewed from a user side (a front side of FIG. 1), on the back of the card support surface 11. In addition, as shown in FIG. 5, a rear end 14a of the first acrylic plate 14 abuts the bent portion 23 of the cover panel 22, and a lower end of the bent portion 23 abuts an upper surface of the second acrylic plate 15. By configuring so, the card end unit 21 extends through a rear edge of the card support surface 11 to a rear surface of the card support surface 11. By adopting this configuration, it is possible to prevent the card 100 from being caught up in a gap between the surfaces 11 and 12 when the card 100 is abutted against the card end surface 21 and slid on the card support surface 11 as shown in FIG. 2.

Figure 6:
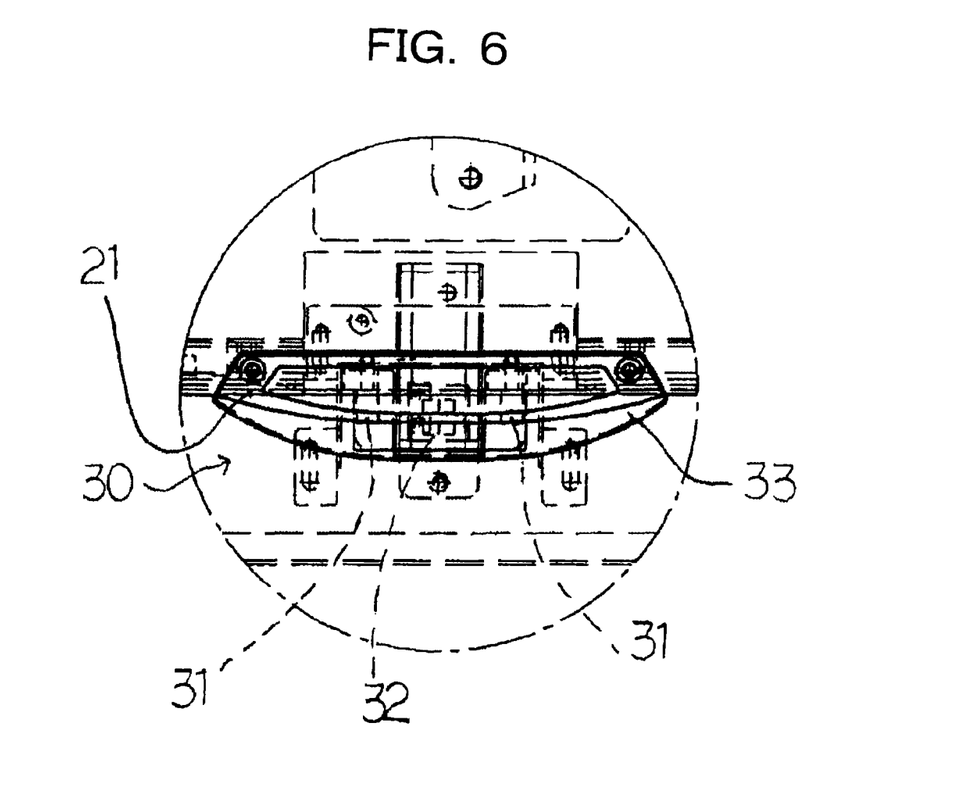
FIG. 6 is a view of a state in which a read unit provided on the operation panel shown in FIG. 2 is viewed from an arrow VI of FIG. 4.
Figure 7:
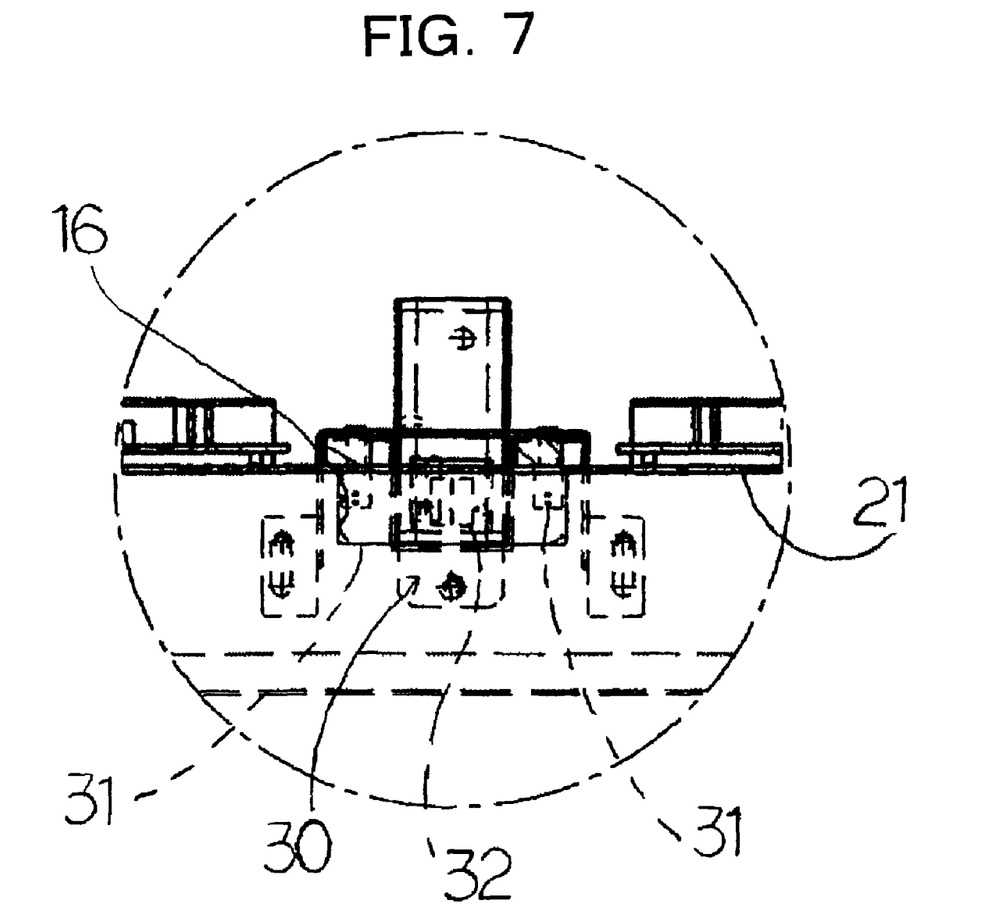
FIG. 7 is a view of a state in which the read unit shown in FIG. 6 is viewed from a rear surface side.

Further, a read unit 30 is provided at a center of the front end of the cover panel 22. As also shown in FIGS. 6 and 7, the read unit 30 includes a pair of left and right photosensors 31, a read head 32 put between the paired photosensors 31, and a cover 33 mounted to the cover panel 22 to cover up the photosensors 31 and the read head 32. Each of the photosensors 31 includes a light projecting unit 31a arranged above the card support surface 11, and a light receiving unit 31b arranged on a lower surface of the first acrylic plate 14. The photosensor 31 detects whether the card 100 enters or exits the read unit 30 by determining whether or not a detection light emitted from the light projecting unit 31a to the light receiving unit 31b is interrupted by the card 100. The light projecting unit 31a and the light receiving unit 31b may be turned upside down.

The read head 32 functions as an input and output executing unit of the information input and output device 10. If the photosensors 31 detects entry of the card 100, the read head 32 is activated to emit an inspection light suitable to read the barcodes 102. If the photosensors 31 detects exit of the card 100, the read head 32 shifts into an inactive mode. The read head 32 is provided to emit the inspection light in an upward direction from the lower surface side of the first acrylic plate 14. The substrate 13 of the card support unit 12 and the second acrylic plate 15 are notched by a notch portion 16 at the position where the sensors 31 and the read head 32 are provided. The mounting positions of the read head 32 in a vertical direction and a longitudinal direction are adjusted so that the card 100 arranged on the card support surface 11 with a surface on which the barcodes 102 are printed facing downward can accurately face the barcodes 102 when the card 100 is slid on the card support surface 11 while abutting the card 100 against the card end surface 21. The read head 32 may be arranged within the cover 33 with the head 32 facing downward.

As evident from FIG. 9, at a portion in which the read head 32 is provided, a rear end 14a of the second acrylic plate 15 does not abut the bent portion 23 of the cover panel 22 and only the rear end 14a of the first acrylic plate 14 abuts the bent portion 23. It is thereby possible to provide the read head 31 between the second acrylic plate and the cover panel 22. The first acrylic plate 14 is provided on the read head 31. Because of this configuration, the first acrylic plate is required to consist of a translucent material. Translucency of the translucent material means a translucency to enables the read head 31 to receive a light. If the read head 31 reads an infrared light the translucency is for the infrared light, if the read head 31 reads a visible light the translucency is for the visible light, and if the read head 31 reads an ultraviolet light the translucency is for the ultraviolet light. The second acrylic plate is not required to exhibit a specific optic characteristic. However, under a configuration in which the read head 31 is provided below the second acrylic plate, the second acrylic plate is required to exhibit a specific optical characteristic similarly to the first acrylic plate.

In the game machine 1 thus configured, the a lot of cards 100 used for a game are arranged on the card support surface 11 side by side with the barcodes 102-printed surface of each card 100 facing downward, and each card 100 is slid on the card support surface 11 while being abutted against the card end surface 21 and caused to sequentially pass through the read unit 30, as shown in FIG. 2. It is thereby possible to read the barcodes 102 of many cards 100 in succession. Differently from the conventional card reader, it is unnecessary for the player to hold the card 100 to be made stand on end to pass through the slit. It suffices to sequentially slide the cards 100 on the card support surface 11 as it is. Besides, only by abutting one side 101 of each card 100 against the card end surface 21, the barcode 102 can accurately pass over the read head 32. Therefore, it is possible to handle a lot of cards 100 handily and read the barcodes 102 of these cards 100 efficiently. In addition, since the material for the card support surface 11 is selected to be able to smoothly slide the cards 100, read efficiency is further improved.

The present invention is not limited to the above-stated embodiment but can be carried out in various manners. For example, the card end surface 21 does not necessarily extend in the right-left direction of the game machine 1 but may be provided to extend obliquely with respect to the right-left direction of the game machine 1 or extend in the anteroposterior direction of the game machine 1.

The card support surface 11 is not always flat but may be provided obliquely with respect to a horizontal plane Alternatively, the card support surface 11 may be a vertical surface. In this case, the player needs to press the cards 100 against the card support surface 11. The card support surface 11 functions as a surface that supports the cards 100 from a rear surface side thereof against the pressing force. Depending on a play style of the game, such a vertical card support surface may be required.

Furthermore, the configuration of the information input and output device 10 is not limited to the game machine 1. The configuration of the information input and output device 10 can be appropriately used in various devices that need to efficiently read information on many cards. In addition, the present invention is applicable not only to the device that reads information from cards but also to the device that writes information to the cards. For example, if a storage medium such as a magnetic storage medium or an IC chip is configured in the card in the above embodiment and a write head is provided in place of the read head, the information input and output device 10 can function as the information write device. Besides, the preferable material for the card support surface described above can be appropriately used for various devices that need to slide cards.

The invention claimed is:

1. An information input and output device for communicating information with an information recording unit of a card, comprising:
   a card support unit including a card support surface for sliding the card while supporting the card from one surface side;
   a card end unit including a card end surface provided to protrude from the card support surface; and
   an input and output executing unit positioned to face the information recording unit of the card when the card is slid on the card support surface while abutting the card against the card end surface, and configured to execute at least one of reading of the information from the information recording unit and writing of the information to the information recording unit,
   wherein the card support surface extends with the card end surface in a horizontal direction and has an area enough to arrange a plurality of cards and to slide a selected one of the plurality of cards while abutting the card against the card end surface, and the card end surface extends on both sides of the input and output executing unit so that the card sliding on the card support surface is allowed to pass through the input and output executing unit.

2. The information input and output device according to claim 1, wherein the card end unit is positioned in a back portion of the card support surface, and the card end surface extends in a right-left direction from a viewpoint of a user who uses the information input and output device.

3. The information input and output device according to claim 1, wherein the card end surface exceeds an edge of the card support surface and extends toward a rear surface side of the card support surface in a portion of an intersection between the card support surface and the card end surface.

4. The information input and output device according to claim 1, wherein the card support surface has a translucent material, and the input and output executing unit is positioned to face the card information recording unit from a rear surface side of the card support unit.

5. The information input and output device according to claim 1, wherein the card support surface has a methacrylic resin.

6. The information input and output device according to claim 1, wherein the card support surface has a methacrylic resin having an antistatic property of 0.1 seconds or less in a testing method specified in JIS L-1094.

7. The information input and output device according to claim 6, wherein an acrylic resin in the card support surface has a surface hardness corresponding to a pencil hardness equal to or higher than five H, the pencil hardness being specified in JIS D-0202.

8. A game machine having an information input and output device for communicating information with an information recording unit of a card provided at an operation panel unit, wherein the information input and output device comprises:
   a card support unit that includes a card support surface for sliding the card while supporting the card from one surface side;
   a card end unit that includes a card end surface provided to protrude from the card support surface; and
   an input and output executing unit that is arranged to face the information recording unit of the card when the card is slid on the card support surface while abutting the card against the card end surface, and that executes at least one of reading of the information from the information recording unit and writing of the information to the information recording unit,
   wherein the card support surface extends with the card end surface in a horizontal direction and has an area enough to arrange a plurality of cards and to slide a selected one of the plurality of cards while abutting the card against the card end surface, and the card end surface extends on both sides of the input and output executing unit so that the card sliding on the card support surface is allowed to pass through the input and output executing unit.

9. An information input and output device for communicating information with an information recording unit of a card, comprising:
   a card support unit that includes a card support surface for sliding the card while supporting the card from one surface side, and
   an input and output executing unit that executes at least one of reading of the information from the information recording unit of the card sliding across the card support surface and writing of the information to the information recording unit of the card sliding across the card support surface,
   wherein the card support surface extends with the card end surface in a horizontal direction and has an area enough to arrange a plurality of cards and to slide a selected one of the plurality of cards while abutting the card against the card end surface, and the card support surface consists of a methacrylic resin having an antistatic property of 0.1 seconds or less in a testing method specified by JIS L-1094.

10. The information input and output device according to claim 9, wherein the acrylic resin that constitutes in the card support surface has a surface hardness corresponding to a pencil hardness equal to or higher than five H, pencil hardness being specified in JIS D-0202.

* * * * *